METHOD OF FABRICATING MAGNETIC RECORDING MEDIA

Filed Jan. 17, 1966

INVENTORS
ROBERT S. HAINES
JOSEPH J. VRANKA
BY D W Margolis
ATTORNEY 3,479,219

METHOD OF FABRICATING MAGNETIC RECORDING MEDIA

Robert S. Haines, Poughkeepsie, and Joseph S. Vranka, Clintondale, N.Y., assignors to International Business Machines Corporation, Armonk, N.Y., a corporation of New York Filed Jan. 17, 1966, Ser. No. 521,057
Int. Cl. G03g *19/00;* G11b *5/62*
U.S. Cl. 117—235 7 Claims

ABSTRACT OF THE DISCLOSURE

A method of gas plating ferromagnetic alloys having coercivities greater than 100 oersteds in which the gas subject to decomposition includes a decomposable compound of a ferromagnetic metal and sufficient decomposable dopant to cause the plated material to have a semi-particulate aggregate form.

This invention relates to ferromagnetic alloys having coercivities, and more particularly to a method for producing magnetic recording media by a gas plating process and for providing an improved magnetic recording surface.

Magnetic recording media in such forms as tapes, drums, discs, loops, cards, stripes and the like are extensively used in computer and data processing systems. Currently, the most widely used magnetic coating material for producing magnetic recording media is composed of a finely divided $\gamma$-ferric oxide dispersion in a suitable binder composition. Other magnetic coatings take the form of plate films, such as vacuum deposited, chemical (electroless) deposited and electro-deposited materials. Such plated coatings have found some use, or have been contemplated for use, where high-density data storage is required.

Deposition of ferromagnetic metallic layers by gas plating has been suggested for use in the production of magnetic materials. However, until the present invention, magnetic films having sufficiently high coercivity for a high density magnetic recording device have not been made by gas plating. Heretofore, the materials produced by gas plating have been magnetically soft, and had inherently low coercivity so as to best lend themselves to uses in bistable devices and low frequency recording.

By gas plating, what is meant is, the vapor-phase deposition of metal or allow from a controlled atmosphere containing at least one volatile heat-decomposable gaseous metal compound. The deposition product may be in the form of a powder, or, as in the present application, in the form of a compact coherent coating adherently bonded to a suitable workpiece or substrate. The deposition involves decomposition in that the volatile metal compound, most commonly carbonyl, undergoes the following general decomposition reaction:

$$M_x(CO)_y\uparrow(\text{gas}) \xrightarrow{\text{heat}} xM\downarrow\ (\text{solid}) + yCO\uparrow(\text{gas})$$

in which $x$ and $y$ are small whole numbers and M represents a metal. On occasion this technique has been referred to as "vapor pyrolysis."

Plated coatings of coherent ferromagnetic metal, including gas plated coatings, are generally superior in many respects to magnetic $\gamma$-ferric oxide or other particulate types of magnetic coatings. Particulate coatings are normally dispersed in a suitable binder composition. In such a coating the binder and other non-magnetic constituents normally make up at least 50 percent of the volume of the final magnetic coating. Therefore, in order to have sufficient magnetic material to obtain a desired level of signal output, it is necessary that a considerable thickness of coating material be placed on the substrate, with the result that mass is fairly large. Because of inertial effects, the lowest possible mass is desired in recording media which are subject to sudden stops, starts, and reversals. Recording media of the particulate type are also found to have a rough surface which encourages record media to transducer separation. Such separations result in loss of signal and bit dropout which appears as errors in the recording. The rough abrasive surface also causes excessive wear on the magnetic recording transducer. Therefore, in order to avoid loss of signal, errors and transducer wear a smooth coherent surface is desirable. Additionally, the bit density storage capacity of particulate magnetic recording media is quite low in comparison to the bit density storage capacity of coherent ferromagnetic metal coated recording media. Therefore, coherent ferromagnetic metal coated recording media are desirable since high bit density lends itself to the most efficient storage of information.

High density magnetic recording requires a fairly high coercivity, $H_c$. For a magnetic recording to be a permanent record, the demagnetizing field, $H_d$, must be somewhat less than the coercivity. At high recording densities, such as above 5000 bits per inch, when using coherent metallic ferromagnetic coatings, the demagnetizing field is on the order of 100 oersteds. This necessitates a magnetic coating having a coercivity greater than the 100 oersted demagnetizing field. No prior art method available for gas plating is known to produce a ferromagnetic coating which has a coercivity substantially above 100 oersteds.

It is thus an object of the invention to provide a method for gas plating high coercivity magnetic films having optimum magnetic properties.

It is a further object of this invention to provide a method for gas plating magnetic cobalt, iron and nickel alloys having a controlled coercivity of greater than 100 oersteds.

It is another object of this invention to provide a magnetic recording member composed of a ferromagnetic metal alloy which has a controlled coercivity of greater than 100 oersteds together with other satisfactory magnetic properties.

These and other objects are accomplished in accordance with the broad aspects of the present invention by providing a method which alloys the deposition by gas plating techniques of high coercivity magnetic recording alloys. In the operation of this invention a substrate is subjected to a gas plating atmosphere containing at least one decomposable gaseous compound of a ferromagnetic metal and at least one decomposable gaseous alloying compound. The substrate or gas plating atmosphere is heated to a temperature sufficiently high to decompose the gas plating compounds within a plating chamber. The nascent elements thus released from the compound by decomposition are then condensed onto the substrate in the form of a magnetic alloy. Thereafter the recording media formed by coating magnetic alloy on a substrate is removed from the gas plating atmosphere.

The resulting film has a coercivity substantially greater than 100 oersteds depending upon the particular ferromagnetic metal alloy formed. Coercivities as great as 400 oersteds have been achieved for films made according to the present procedure. This is contrasted with coatings having coercivities of substantially less than 100 oersteds, and most commonly less than 10 oersteds, for prior art gas plating methods.

Ferromagnetic materials utilized in forming the magnetic alloy coatings of the present invention are iron, cobalt and nickel. The gaseous sources of the iron, cobalt and nickel are not critical to this invention; however, the carbonyls, and more specifically, iron pentacarbonyl, dicobalt octacarbonyl and nickel tetracarbonyl are preferred as the respective sources of iron, cobalt and nickel. Of course, any suitable ferromagnetic compound, or mixture of compounds, capable of being vaporized and having a decomposition temperature may be employed in the gas plating process. This is especially true of compounds related to the carbonyls in such a manner that the carbonyls may be regarded as parent compounds. These second generation compounds include the metal nitrosyl carbonyls, the metal carbonyl hydrides, the metal carbonyl halides, and other metal carbonyls containing other coordinated groups. These volatile compounds, from which ferromagnetic metals may be derived by heat-decomposition, are only illustrative with respect to the practice of the present invention and are not intended to be limiting.

The gas plating process is conducted with the aid of an inert or non-reactive carrier gas which is used to control the flow rate of the plating gas and the pressure in the plating chamber. Helium, argon, carbon monoxide, carbon dioxide, nitrogen or other non-reactive gases may be suitably employed as the carrier gas in the practice of the present invention. Hydrogen may also be utilized, for example, where a reducing atmosphere is desired. Within a broad range of well known materials the choice of the carrier gas is discretionary. Substrates which may be coated by gas plating cover a wide range of materials. They include, but are not limited to, metals, organic polymeric materials, paper, glass and ceramics.

The gas plating operation utilizing heat-decomposable compounds requires that the temperature be raised to a point sufficiently high to cause the compounds to decompose and deposit their elemental constituents on the to-be-coated substrate. Each heat-decomposable compound has a temperature range at which decomposition takes place. In order to deposit coatings on a substrate by gas plating, it is necessary that the gas or the substrate be maintained at a temperature in the general decomposition range of the gaseous compounds used to effect the gas plating. Where the substrate consists of organic polymeric material, paper or other material having a softening point or decomposition point below the temperature of gaseous plating, substrate deterioration may be avoided by means which are well known in the art.

Heat energy needed to decompose the plating gases may be supplied in any number of ways. In the most simple operation the substrate is heated by conduction by placing it in contact with a heated element. Other methods of heating include heat radiation and subjecting the decomposable gases to electromagnetic energy of a microwave or radio frequency. Glow discharge radiation may also serve as a source of decomposition energy. In any event, it is desirable that the process be carried out under precisely controlled conditions of temperature, pressure and time. Control of these parameters allows the substrate to be coated with material having controlled physical-chemical properties.

Advantages of producing magnetic recording media by gas plating, in addition to those previously stated, are that this process allows the deposition of thin uniform coatings of coherent ferromagnetic alloys, and that it allows this deposition in a continuous and highly controlled manner. Contamination such as that sometimes experienced in plating from aqueous plating baths is easily avoided. Also avoided, by utilizing gas plating techniques, is the unpredictability of aqueous plating bath lives. In addition, gas plating allows high speed low cost production in a rapid and continuous manner with a minimum of labor.

The foregoing and other objects, features and advantages of the present invention will be apparent from the following more particular description of the preferred embodiments of the invention as illustrated in the accompanying drawings in which.

Figures 1, 2:
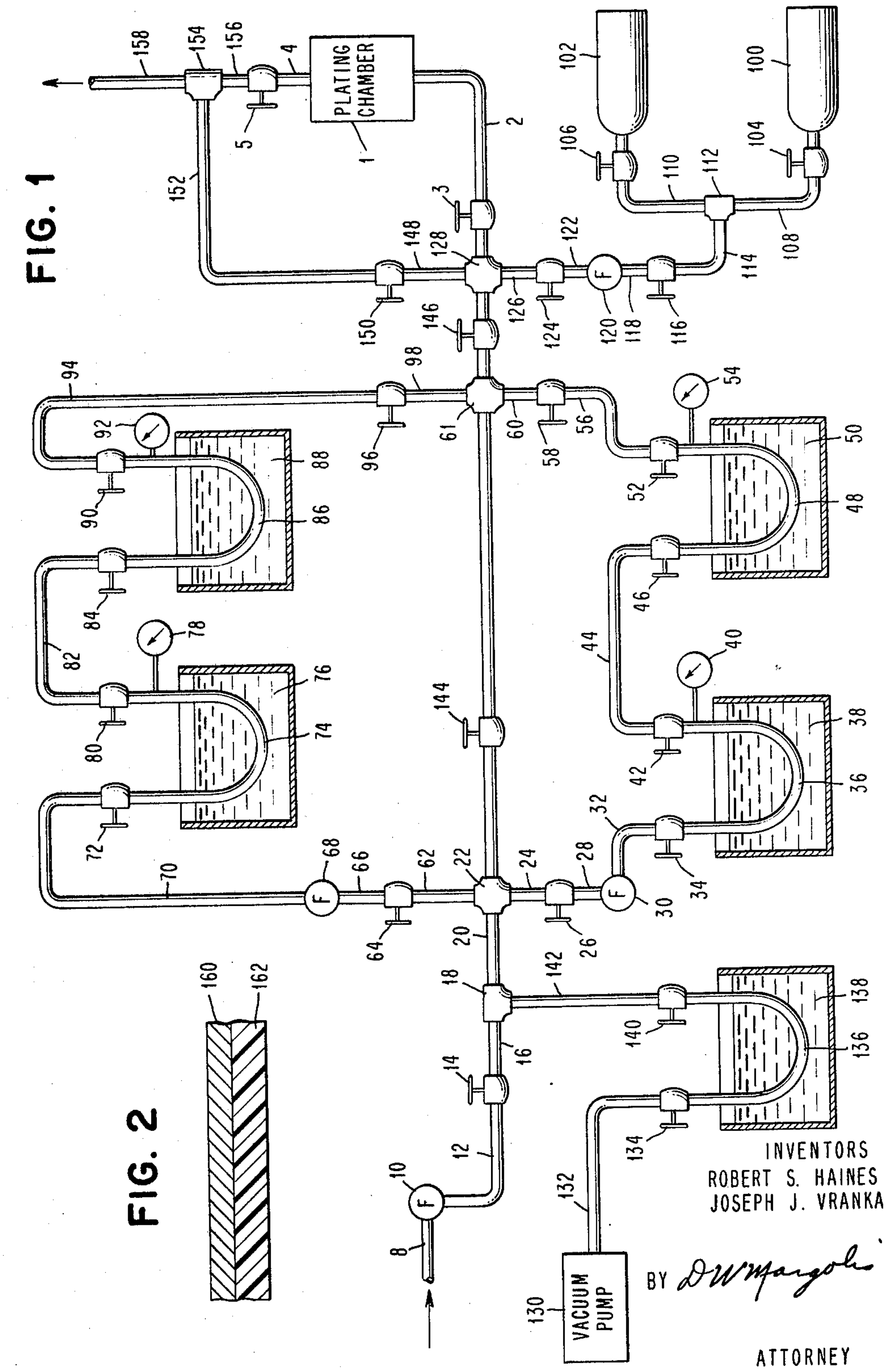
FIGURE 1 is a schematic arrangement of apparatus used in performing the gas plating operation of the present invention.
FIGURE 2 is an exaggerated cross-sectional view of a portion of a recording media prepared in accordance with the present invention.

Referring now more particularly to FIGURE 1, there is shown a schematic diagram of a positive pressure system employed in producing recording media by gas plating. The substrate to be coated (not shown) is located in plating chamber 1 which is connected by means of tube 2 and valve 3 to a system capable of creating and supplying the desired mixed gas plating atmosphere. Plating chamber 1 has an outlet 4 controlled by valve 5 through which exhaust gases pass.

The positive pressure system consists of an inlet 8 through which a regulated carrier gas enters the system from a source (not shown). Inlet 8 is connected to flowmeter 10 which measures the rate at which the carrier gas enters into the system. Flowmeter 10 is connected by tube 12 to valve 14 which serves to regulate the flow of carrier gas into the system. Valve 14 is connected through tube 16 to T-joint 18 which is in turn connected through tube 20 to joint 22 at which point the flow of carrier gas may be directed into one of several desired paths.

Joint 22 is connected through tube 24 to valve 26 which controls the flow of carrier gas to what shall be hereinafter referred to as the "lower gas generating system." Valve 26 is connected through tube 28 to flowmeter 30 which measures the flow of carrier gas into the lower gas generating system. Flowmeter 30 is connected by means of tube 32 to valve 34. Valve 34 is connected to reservoir 36 which may contain a volatile compound from which heat-decomposable metal plating gas may be generated. Reservoir 36 resides within temperature control bath 38 which serves to control the rate at which plating gas is generated by controlling the temperature of reservoir 36. Gauge 40 is connected into reservoir 36 to measure the gas pressure within the reservoir area. Valve 42 is connected to reservoir 36 and with valve 34 serves to control the accessibility of reservoir 36 to the rest of the system. Valve 42 is connected through tube 44 to valve 46 which serves to control in part the accessibility of trap 48. Trap 48 resides within temperature control bath 50 containing ice, water or other refrigerant material. Cooling of trap 48 serves to remove any entrained droplets in the gas stream and to control the gas concentration by the thermal trapping of the gas stream within a constant temperature system. Trap 48 is connected to valve 52 which along with valve 46 serves to control the accessibility of trap 48 to the rest of the system. Gauge 54 connected into trap 48 serves to measure the pressure within the trap area. Valve 52 is connected through tube 56 to valve 58 which serves to control the accessibility of the lower gas generating system to the remainder of the system through tube 60 at joint 61.

As hereinafter referred to "upper gas generating system" is connected to joint 22 by tube 62 at valve 64 which serves to control the access of carrier gas into the upper gas generating system. Valve 64 is connected through tube 66 to flowmeter 68 which measures the flow of carrier gas into the upper gas generating system. Flowmeter 68 is connected by means of tube 70 to valve 72. Valve 72 is connected to reservoir 74 which may contain a volatile compound from which heat-decomposable metal plating gas may be generated. Reservoir 74 resides within temperature control bath 76 which serves to control the rate at which plating gas is generated by controlling the temperature of reservoir 74. Gauge 78 is connected into reservoir 74 to measure the gas pressure within the reservoir area. Valve 80 is connected to reservoir 74 and with valve 72 serves to control the accessibility of reservoir 74 to the rest of the system. Valve 80 is connected through tube 82 to valve 84 which serves to control in part the accessibility of trap 86. Trap 86 resides within temperature control bath 88 containing ice, water or other refrigerant material. Cooling of trap 86 serves to remove any entrained droplets in the gas stream and to control the gas concentration by the thermal trapping of the gas stream within a constant temperature system. Trap 86 is connected to valve 90 which along with valve 84 serves to control the accessibility of trap 86 to the rest of the system. Gauge 92 connected into trap 86 serves to measure the pressure within the trap area. Valve 90 is connected through tube 94 to valve 96 which serves to control the accessibility of the upper gas generating system to the remainder of the system through tube 98 at joint 61.

Auxiliary gas cylinders 100 and 102 controlled by valve 104 and 106 respectively serve as sources of auxiliary gases which may be desired to be included in the gas plating atmosphere. Cylinders 100 and 102 are connected with the plating system through tubes 108 and 110, respectively, which meet at T-joint 112. T-joint 112 is connected through tube 114, check valve 116 and tube 118 to flowmeter 120 which measures the rate at which auxiliary gases are entering the system. Flowmeter 120 is connected through tube 122 to valve 124 which serves to control the accessibility of the auxiliary gas delivery system to the remainder of the system through tube 126 at joint 128.

Vacuum pump 130 is connected to the system and serves to evacuate the system or to otherwise control its pressure. Vacuum pump 130 is connected through tube 132 and check valve 134 to trap 136. Trap 136 resides within temperature control bath 138 which serves to lower the temperature within trap 136 and thus trap entrained particles and fluids from the gaseous flow. Valve 140 is connected to trap 136 and serves to control the accessibility of the vacuum system to the rest of the system through tube 142 at T-joint 18.

Valves 144 and 146 mounted along the central tube are useful in controlling the flow of gases throughout the system.

Joint 128 connects to plating chamber bypass tube 148 controlled by valve 150 which allows gas to pass through tube 152 to T-joint 154. T-joint 154 is connected with tube 156 which conveys exhaust from the plating chamber. T-joint 154 is also connected to outlet 158 which exhausts waste gas from the system.

Utilizing the above described system a multi-constituent ferromagnetic alloy can be gas plated in the plating chamber with a minimum of difficulty. For example, iron pentacarbonyl may be generated in the upper gas generating system and nickel pentacarbonyl in the lower gas generating system. This allows the formation, by gas plating, of iron, nickel or iron-nickel alloys. Alternatively, for example, dicobalt octacarbonyl may be substituted for iron pentacarbonyl in the upper gas generating system. This allows the formation of cobalt or cobalt-nickel alloys. Auxiliary gases such as hydrogen sulfide or phosphine may be placed in the auxiliary gas cylinders 100 and 102, respectively. This allows the formation of alloys containing sulfur or phosphorus.

In the operation of this system safety is a major consideration due to the extreme toxicity, flammability and, in some cases, pyrophoric nature of the gas plating compounds. It is desirable, before plating, to first completely evacuate the system. This is done by opening all valves but 5, 14, 104, 106 and 150 and activating vacuum pump 130. After the system has been completely exhausted valve 140 is closed and the system is flushed with nonreactive carrier gas by opening valves 5 and 14.

After the apparatus has been prepared for operation by evacuation and flushing, reservoirs 36 and 74 are filled, as needed, with appropriate volatile compounds. Saturators may be substituted for either or both of the reservoirs. This is especially desirable when the volatile compound is a liquid. Similarly, mist filters, which serve the same function as the traps, may be substituted for traps 48 and 86.

In a typical plating run the to-be-plated substrate is mounted in plating chamber 1 under clean conditions. The construction of plating chamber 1 differs for each type and shape of substrate to be plated. Construction details of the chamber are unimportant as long as the chamber has provision for supplying heat to the substrate or gaseous plating atmosphere and means to adequately circulate the gaseous plating atmosphere around the to-be-plated substrate. Where material, such as a flexible tape substrate, is fed through the chamber in a continuous manner gas-locks, not shown, are of course necessary.

After insertion of the substrate material into the plating chamber the entire system, except for the lower and upper gas generating systems and the auxiliary gas cylinders, is opened to the vacuum pump and evacuated to approximately 0.2 torr. At this time the various temperature control baths are activated and the heat source in the plating chamber is activated. Subsequently, the vacuum pump is closed off from the system by closing valve 140 and the system pressurized with carrier gas through inlet 8 by opening valve 14. After the plating chamber has reached the desired temperature, and thermal equilibrium has set in, valve 3 to the plating chamber is closed, valve 150 on the bypass line is opened. Then the valves in the desired gas generating system or auxiliary gas cylinders are opened to prepare the desired mix of plating gas. The flow rate of each constituent gas is set by adjusting the various valves and the flow pattern of the gas train is directed into the desired path. For example, all carrier gas could be directed into either the upper or the lower gas generating system. Alternatively the carrier gas could be divided into as many as three paths at joint 22, one through the central tube of the system, one through the lower gas generating system and one through the upper gas generating system. Where auxiliary gas is to be utilized, from cylinders 100 or 102, the valve of the appropriate cylinder is opened and the flow regulated into the system where a mix is formed with the carrier gas and other heat-decomposable gas or gases. When the desired flow rates and temperatures are achieved the gas flow is diverted through plating chamber 1 by closing valve 150 and opening valves 3 and 5. This causes alloy deposition to begin.

After the desired plating time, or, in a continuous plating process, after the end of a run, the flow of gas is rediverted to the bypass line by opening valve 150 and closing valves 3 and 5. All valves in the gas generating systems and the auxiliary gas system are closed. The remaining carrier lines are then flushed with carrier gas to remove any remaining plating gas. Following this operation the plating chamber is opened to the carrier gas and thoroughly flushed until no trace of plating gas remains. The heat generating means in the plating chamber may then be shut down and the cooling refrigerants removed from the various locations throughout the system.

The following examples are included to aid in the understanding of the invention. Variations may be made by one skilled in the art without departing from the spirit of the invention.

EXAMPLE I

An apparatus similar to that shown in FIG. 1 was used to produce a magnetic recording media. Nickel tetracarbonyl was placed in reservoir 36 of the lower gas generating system. Hydrogen sulfide was in auxiliary gas cylinder 100. A loop substrate of polyethylene terephthalate having a thickness of 1 mil was placed in plating chamber 1 around a suitable heat-producing mandrel. During plating the temperature on the mandrel was maintained at about 200° F. Total flow of gases through the plating chamber was at the rate of about 15 liters per minute during plating. The gases flowing through the plating chamber consisted of nitrogen, which was utilized in this case as the carrier gas, nickel tetracarbonyl at a rate of about 0.25 liter per minute and hydrogen sulfide at a rate of about 0.10 liter per minute. Plating was carried on under these conditions for about 1 minute. The gas plated loop was allowed to cool and removed from the chamber. The resulting magnetic recording media had a cross-sectional structure similar to that shown at FIG. 2, wherein a layer of coherent magnetic alloy 160 is coated upon substrate 162. The coercivity of the resultant magnetic coating was about 150 oersteds. The film was found to be isotropic.

As a control, nickel gas plating was carried out under conditions similar to those described above, with the exception that no hydrogen sulfide was included in the gas plating atmosphere. The resulting gas plated nickel coating had a coercivity of about 44 oersteds.

EXAMPLE II

Example I was repeated with modification of the flow of nickel tetracarbonyl to a rate of about 0.15 liter per minute and a modification of the plating temperature to 175° F. The coercivity of the resulting isotropic magnetic film was 107 oersteds.

EXAMPLE III

Example I was repeated using phosphine in auxiliary cylinder 102 and a plating temperature of 175° F. Total flow of gases through the plating chamber was at a rate of about 15 liters per minute. The gases flowing through the plating chamber were nitrogen carrier gas, nickel tetracarbonyl at a rate of about 0.10 liter per minute and phosphine at a rate of 0.10 liter per minute. Plating time was 30 seconds. The resulting gas plated isotropic magnetic coating had a coercivity of 107 oersteds.

EXAMPLE IV

A magnetic recording media was produced using an apparatus similar to that shown in FIG. 1. Iron pentacarbonyl was placed in reservoir 74 of the upper gas generating system. Hydrogen sulfide was in auxiliary gas cylinder 100. A polyethylene terephthalate substrate 1 mil thick was placed in the plating chamber and plating gas was passed through the chamber at a total rate of about 15 liters per minute. The gas included nitrogen as a carrier gas, iron pentacarbonyl at a rate of about 0.40 liter per minute and hydrogen sulfide at a rate of about 0.10 liter per minute. The plating temperature was on the order of about 240° F. to about 260° F. Plating was carried out under these conditions for about 10 minutes. The resulting recording media was allowed to cool and removed from the chamber. The coercivity of the resulting gas plated isotropic magnetic coating was found to be 278 oersteds. Analysis of the coating by X-ray fluorescence, without a standard, indicated a content of about 80% iron and about 20% sulfur.

As a control, iron was gas plated from iron pentacarbonyl in a manner similar to that described above, without the inclusion of hydrogen sulfide in the gas plating atmosphere. The resulting plated iron coating had a coercivity of about 10 oersteds.

An attempt was made to produce ferromagnetic $Fe_3O_4$ from iron pentacarbonyl by gas plating iron in the presence of oxygen. Plating took place in a chamber at a temperature of about 250° F. on a substrate of polyethylene terephthalate. The total gas pressure in the chamber was equivalent to approximately 700 microns of Hg. Iron pentacarbonyl and oxygen were present in stoichiometric proportions necessary to produce $Fe_3O_4$. After plating was completed the substrate was allowed to cool and removed from the plating chamber and a uniform reddish-orange coating was noted to have formed on the substrate. Upon testing it was found that the coating was non-ferromagnetic in nature. It would appear that the iron oxide which formed was anti-ferromagnetic $\alpha$-$Fe_2O_3$. This line of experiments was not pursued due to the extreme danger felt to be present in utilizing carbonyl compounds in the presence of oxygen. It was felt that if higher gas pressure were utilized the only result would be to increase the plating rate.

EXAMPLE V

An apparatus similar to that shown in FIG. 1 was used to form a magnetic coating, with dicobalt octacarbonyl in the upper gas generating system and hydrogen sulfide in auxiliary gas cylinder 100. The substrate material in the plating chamber was 5 mils thick polyethylene terephthalate, and the temperature in the plating chamber during plating was 250° F. Total gas flow through the chamber was at a rate of 15 liters per minute. This included nitrogen carrier gas, dicobalt octacarbonyl at a rate of 0.6 liter per minute and hydrogen sulfide at a rate of about 0.05 liter per minute. Plating time was 7 minutes. The resulting isotropic magnetic coating had a coercivity of about 320 oersteds. Analysis by X-ray fluorescence, without a standard, indicated that the coating consisted of about 86% cobalt and 14% sulfur.

As a control, the above procedure was repeated under similar conditions using dicobalt octacarbonyl as the only plating gas. The resulting gas plated coating had a coercivity of about 47 oersteds.

Cobalt from dicobalt octacarbonyl was plated as above without the inclusion of hydrogen sulfide in the plating atmosphere and with the plating gas directed at an angle of 64° to the substrate. The resulting coating had a coercivity of 128 oersteds. The increased coercivity achieved by this angular deposition technique is believed to be due to shape effects in the resulting crystallographic structure of the plated material.

EXAMPLE VI

Apparatus similar to that shown in FIG. 1 was used to produce a magnetic coating, with nickel tetracarbonyl in the lower gas generating system, dicobalt octacarbonyl in the upper gas generating system and hydrogen sulfide in auxiliary gas cylinder 100. The substrate was 5 mils thick polyethylene terephthalate and the temperature in the plating chamber during plating was 200° F. The total flow rate of gases through the plating chamber was at a rate of 15 liters per minute. This included nitrogen as the carrier gas and nickel tetracarbonyl at a rate of about 0.009 liter per minute, dicobalt octacarbonyl at a rate of about 0.06 liter per minute and hydrogen sulfide at a rate of about 0.035 to about 0.040 liter per minute. The total plating time was on the order of 5 minutes. After cooling the plated substrate was removed from the plating chamber and the coercivity of the isotropic coated material was found to be 400 oersteds. Analysis of the material by X-ray fluorescence, without a standard, indicated that it consisted of about 84% nickel, 10% cobalt and 6% sulfur.

A similar procedure was followed to plate nickel-cobalt, without the use of hydrogen sulfide in the plating atmosphere. In two successive runs, with slightly varying flow rates, the coercivity was 68 oersteds and 95 oersteds.

In another attempt at producing gas plated nickel-cobalt, as described above, but without hydrogen sulfide, the resulting coating had a coercivity of about 340 oersteds. Analysis of this material by X-ray fluorescence, without a standard, indicated that it had a content of about 50% cobalt and about 50% nickel. This result is felt to be anomalous with respect to the other experimental data. It may be subject to explanation as a matter of the crystallographic structure of the specific resulting alloy as explained hereinafter.

The following theory is advanced as a possible explanation of the improved magnetic characteristics obtained by utilizing the process of the present invention. Inclusion of sulfur, phosphorus or other material in the matrix of the plated film is thought to break up the coherent continuity of the metallic film, on a microscopic scale, causing the film to behave as a semi-particulate aggregate. Such a semi-particulate aggregate would have high coercivity due to the single domain character of the microscopic "particles." Such particles inhibit domain wall propagation which propagation normally decreases coercivity. With such a proposed structure, coherent rotational processes are unlikely. However, incoherent reversals may occur and thus account for the observed magnetic properties. This theory may also account for, and be consistant with, the anomalous results shown in the previous example wherein cobalt-nickel of high coercivity was obtained without the inclusion of non-metallic material in the structure. In that case the specific alloy may have had a structure which behaved as a semi-particulate aggregate.

Based on the above theory it becomes evident that other materials, in addition to those specifically disclosed, may be included in the matrices of magnetic alloys to achieve high coercivity. Such materials might include, for example, as non-limiting examples, material plated from the selenides and tellurides. In addition, it is apparent that the source of sulfur or phosphorus is not limited to the specific examples which have been shown above, but rather, would include any heat-decomposable source of sulfur or phosphorus.

Analysis of the gas plated metal alloys indicated the absence of carbon within the matrix structure. Experimental experience indicates that high plating temperatures encourage the formation of carbon in the gas plated alloys, whereas relatively low temperatures, such as those used in this application due to the nature of the substrate material, do not encourage the formation of carbon. This is only significant as showing the absence of carbon in the specific experimental examples, since the inclusion of carbon may well cause the structure to behave like a semi-particulate aggregate with improved magnetic characteristics.

The coatings produced by gas plating in the above examples were found to be isotropic in character. No special procedure was utilized to produce such isotropic films. The natural character of such coatings by gas plating would appear to be isotropic.

While magnetic fields were not utilized to orient the structure in the present invention, it is contemplated that either a stationary or moving magnetic field might be utilized to enhance the magnetic properties of the gas plated coatings.

It will be apparent to those skilled in the art that modifications may be made in the process disclosed herein without departing from the spirit or scope of the invention.

What is claimed is:

1. A method of fabricating a high density magnetic recording media in the form of a substrate and a gas-plated isotropic ferromagnetic alloy having a coercivity greater than 100 oersteds coated on said substrate, including the step of:

subjecting said substrate to a gas plating atmosphere under conditions such that the gas plating atmosphere decomposes to form an isotropic ferromagnetic alloy, said gas plating atmosphere including an inert carrier gas, at least one heat-decomposable compound of a ferromagnetic material, and a heat-decomposable dopant compound, said heat decomposable compounds being present in relative proportions so as to produce a semi-particulate aggregate structure in the resulting plated alloy; wherein the gas plating atmosphere is a mixture selected from the group consisting of:

(a) a mixture including heat-decomposable sulfur compounds and heat-decomposable nickel compounds, the ratio, by volume, of said compounds being on the order of at least 1 part sulfur compound to 2.5 parts nickel compound;

(b) a mixture including heat-decomposable nickel compounds and heat decomposable phosphorus compounds, the ratio, by volume, of said compounds being on the order of 1 part nickel compound to 1 part phosphorus compound;

(c) a mixture including heat decomposable iron compounds and heat-decomposable sulfur compounds, the ratio, by volume, of said compounds being on the order of 4 parts iron compound to 1 part sulfur compound;

(d) a mixture including heat-decomposable cobalt compounds and heat-decomposable sulfur compounds, the ratio, by volume, of said compounds being on the order of 6 parts cobalt compound to 0.5 part sulfur compound; and (e) a mixture including heat-decomposable nickel compounds, heat-decomposable cobalt compounds and heat-decomposable sulfur compounds, the ratio, by volume, of said compounds being on the order of 0.9 part nickel compound to 6 parts cobalt compound to 3.5—4.0 parts sulfur compound.

2. The method of claim 1 wherein the heat-decomposable nickel, iron and cobalt compounds are nickel tetracarbonyl, iron pentacarbonyl and dicobalt octacarbonyl respectively.

3. The method of claim 1 wherein the sulfur producing compound is hydrogen sulfide and the phosphorus producing compound is phosphine.

4. The method of claim 1 wherein the gas plating atmosphere consists of nickel tetracarbonyl and a compound selected from a group consisting of hydrogen sulfide and phosphine.

5. The method of claim 1 wherein the gas plating atmosphere consists of iron pentacarbonyl and hydrogen sulfide.

6. The method of claim 1 wherein the gas plating atmosphere consists of dicobalt octacarbonyl and hydrogen sulfide.

7. The method of claim 1 wherein the gas plating atmosphere consists of nickel tetracarbonyl, dicobalt octacarbonyl and hydrogen sulfide.

References Cited

UNITED STATES PATENTS 3,124,490 3/1964 Schmeckenbecher _ 117—107.2 X

OTHER REFERENCES

W. E. Tewes et al. Catalytic Gas Plating with Nickel Carbonyl, March 1963, pp. 2, 4, 19, 23, 24, 26 and 27.

Collins et al.: Magnetic Behavior of This Single Crystal Nickel Films, December 1953, pp. 283–289.

WILLIAM D. MARTIN, Primary Examiner
B. D. PIANALTO, Assistant Examiner

U.S. Cl. X.R.

117—107.2, 236, 238